(12) United States Patent
Currivan et al.

(10) Patent No.: US 8,817,865 B2
(45) Date of Patent: Aug. 26, 2014

(54) LINEAR DISTORTION AND INTERFERENCE ESTIMATION USING DECISION FEEDBACK EQUALIZER COEFFICIENTS

(75) Inventors: Bruce J. Currivan, Los Altos, CA (US); Thomas J. Kolze, Phoenix, AZ (US); Roger Fish, Superior, CO (US); Victor T. Hou, La Jolla, CA (US)

(73) Assignee: Broadcom Corporation, Irvine, CA (US)

( * ) Notice: Subject to any disclaimer, the term of this patent is extended or adjusted under 35 U.S.C. 154(b) by 113 days.

(21) Appl. No.: 13/406,777

(22) Filed: Feb. 28, 2012

(65) Prior Publication Data

US 2012/0230383 A1     Sep. 13, 2012

Related U.S. Application Data

(60) Provisional application No. 61/451,090, filed on Mar. 9, 2011.

(51) Int. Cl.
     *H04L 27/01*      (2006.01)

(52) U.S. Cl.
     USPC ............................ 375/232; 375/233; 375/229

(58) Field of Classification Search
     USPC .......................................... 375/232, 233, 229
     See application file for complete search history.

(56) References Cited

U.S. PATENT DOCUMENTS

| | | | |
|---|---|---|---|
| 2004/0005001 A1* | 1/2004 | Jones et al. | 375/232 |
| 2004/0032905 A1* | 2/2004 | Dittrich et al. | 375/233 |

* cited by examiner

*Primary Examiner* — Michael Neff
(74) *Attorney, Agent, or Firm* — Garlick & Markison; Shayne X. Short

(57) ABSTRACT

Linear distortion and interference estimation using decision feedback equalizer coefficients. Processing of different respective groups of equalizer coefficients may be made to determine the residual frequency response of an equalizer and/or device in which the equalizer is implemented. Such an equalizer may be implemented within any of a number of respective communication devices including those operative within satellite, wireless, wired, fiber-optic, and/or mobile communication systems. A first group of equalizer coefficients corresponds to certain filtering characteristics of the equalizer and/or device in which the equalizer is implemented. The equalizer is implemented to process a signal to generate a second group of equalizer coefficients. Processing and/or analysis of the first group of equalizer coefficients and the second group of equalizer coefficients will generate a third group of equalizer coefficients corresponding to the residual frequency response of the equalizer and/or device in which the equalizer is implemented.

20 Claims, 14 Drawing Sheets

FIG. 9 • combined FFE and DFE

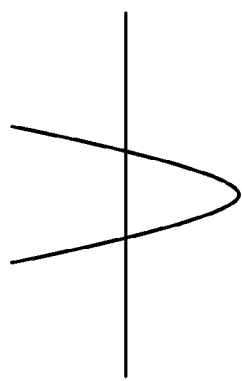
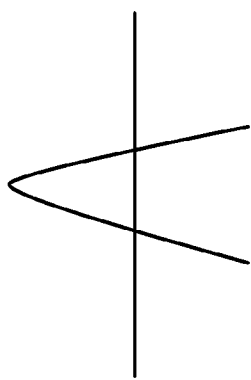
FIG. 10

1400 operating a first equalizer (e.g., feed forward equalizer (FFE)) in accordance with introducing at least one notch or incursion thereby generating inter-symbol interference (ISI) or inter-code interference (ICI) (e.g., adjusting a first at least one equalizer tap (or coefficient)) 1410 operating a second equalizer (e.g., decision feedback equalizer (DFE)) in accordance with inverting for or compensating for the at least one notch in accordance with making overall frequency response (F-RE) of first equalizer and second equalizer being flat (e.g., within tolerance, constraint, etc.) (e.g., adjusting a second at least one equalizer tap (or coefficient)) 1420 based on at least one value of the first at least one equalizer tap (or coefficient) of the first equalizer and/or at least one value of the second at least one equalizer tap (or coefficient) of the second equalizer, identifying narrowband ingress 1430 identifying amount/degree of narrowband ingress 1432

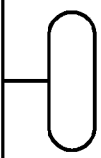

FIG. 14

LINEAR DISTORTION AND INTERFERENCE ESTIMATION USING DECISION FEEDBACK EQUALIZER COEFFICIENTS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 61/451,090, entitled "Linear distortion and interference estimation using decision feedback equalizer coefficients," filed Mar. 9, 2011.

Incorporation by Reference

The following U.S. Utility Patent Applications are hereby incorporated herein by reference in their entirety for all purposes:

1. U.S. Utility patent application Ser. No. 13/310,275, entitled "System and method for linear distortion estimation by way of equalizer coefficients," filed Dec. 2, 2011, which claims priority pursuant to 35 U.S.C. §120, as a continuation, to the following U.S. Utility patent application which is hereby incorporated herein by reference in its entirety and made part of the present U.S. Utility patent application for all purposes:

2. U.S. Utility patent application Ser. No. 12/561,736, entitled "System and method for linear distortion estimation by way of equalizer coefficients," filed Sep. 17, 2009, now issued as U.S. Pat. No. 8,073,086 B2 on Dec. 6, 2011, which claims priority pursuant to 35 U.S.C. §120, as a continuation, to the following U.S. Utility patent application which is hereby incorporated herein by reference in its entirety and made part of the present U.S. Utility patent application for all purposes:

3. U.S. Utility patent application Ser. No. 11/046,783, entitled "System and method for linear distortion estimation by way of equalizer coefficients," filed Feb. 1, 2005, now issued as U.S. Pat. No. 7,602,867 B2 on Oct. 13, 2009, which claims priority pursuant to 35 U.S.C. §119(e) to the following U.S. Provisional patent application which is hereby incorporated herein by reference in its entirety and made part of the present U.S. Utility patent application for all purposes:

3.1. U.S. Provisional patent application Ser. No. 60/602,039, entitled "System and method for linear distortion estimation by way of equalizer coefficients," filed Aug. 17, 2004, now expired.

Incorporation by Reference

The following U.S. Utility patent application is hereby incorporated herein by reference in its entirety and made part of the present U.S. Utility patent application for all purposes:

1. U.S. Utility patent application Ser. No. 13/406,877, entitled "Narrowband ingress estimation and characterization using equalizer taps," filed concurrently on Feb. 28, 2012, which claims priority pursuant to 35 U.S.C. §119(e) to the following U.S. Provisional patent application which is hereby incorporated herein by reference in its entirety and made part of the present U.S. Utility patent application for all purposes:

1.1. U.S. Provisional patent application Ser. No. 61/451,090, entitled "Linear distortion and interference estimation using decision feedback equalizer coefficients," filed Mar. 9, 2011.

BACKGROUND OF THE INVENTION

1. Technical Field of the Invention

The invention relates generally to communication systems; and, more particularly, it relates to devices including one or more equalizers and that are operative within such communication systems.

2. Description of Related Art

Data communication systems have been under continual development for many years. Various types of communication devices implement within such communication systems may include an equalizer. Equalization can be performed to overcome certain deleterious effects that may be incurred by a signal as it traverses one or more communication links within such a communication system. Generally speaking, such equalization as performed within a receiver communication device operates to undo or compensate for any such affects that may be deteriorating the quality of a signal that is received by such a receiver communication device. For example, an estimate of the communication channel by which a signal has been communicated is made, and equalization is often times performed in an effort to undo or compensate for any modification that has been incurred by the signal as it traverses the communication channel.

BRIEF DESCRIPTION OF THE SEVERAL VIEWS OF THE DRAWINGS

FIG. 10 illustrates an embodiment of respective notches or incursions within respective FFE and DFE sections of a communication device.

FIG. 14 illustrates yet another alternative embodiment of a method for operating a communication device.

DETAILED DESCRIPTION OF THE INVENTION

Figure 1:
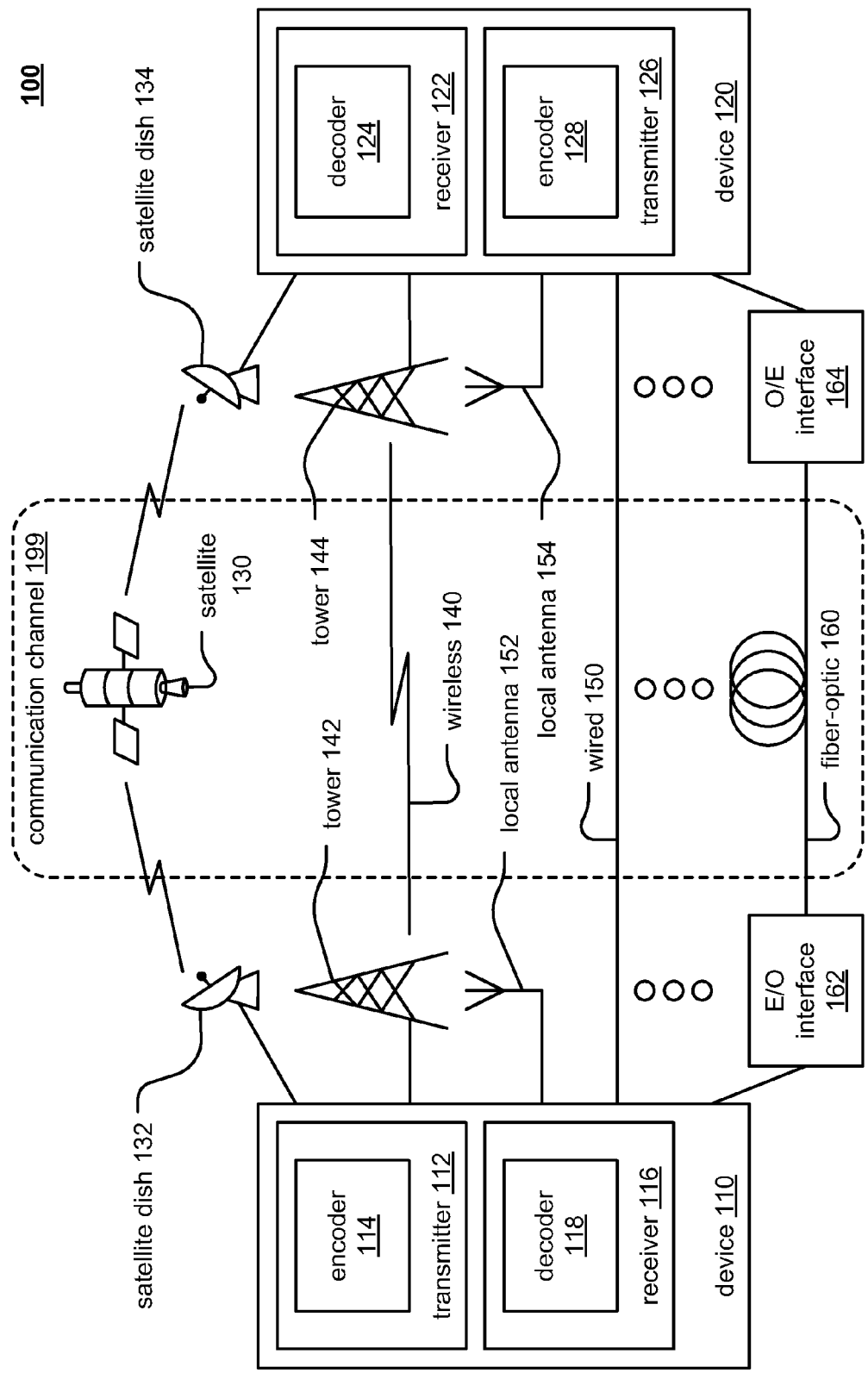
FIG. 1, FIG. 2, and FIG. 3 illustrate various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
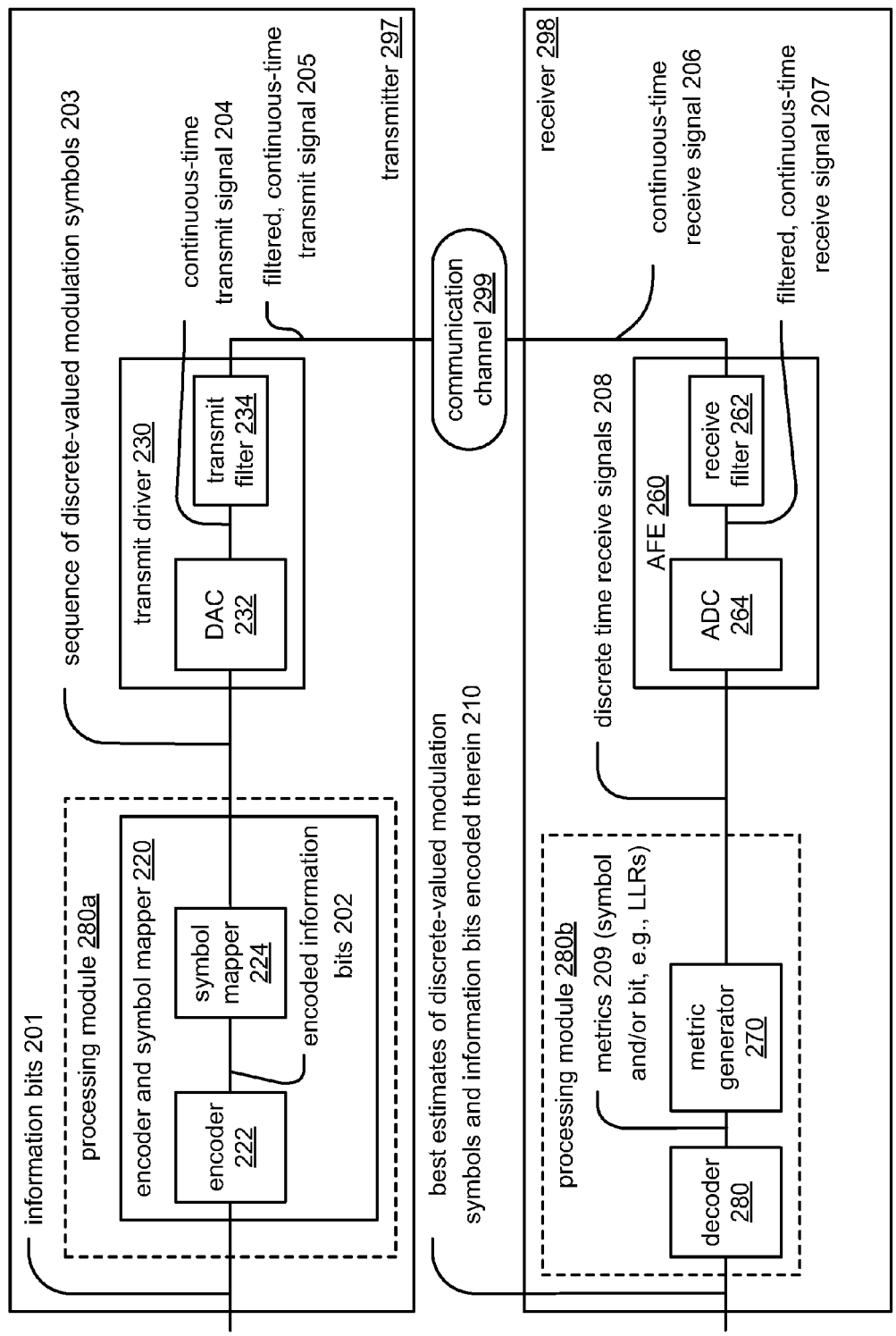

FIG. 1 and FIG. 2 are diagrams illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (0/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Figure 3:
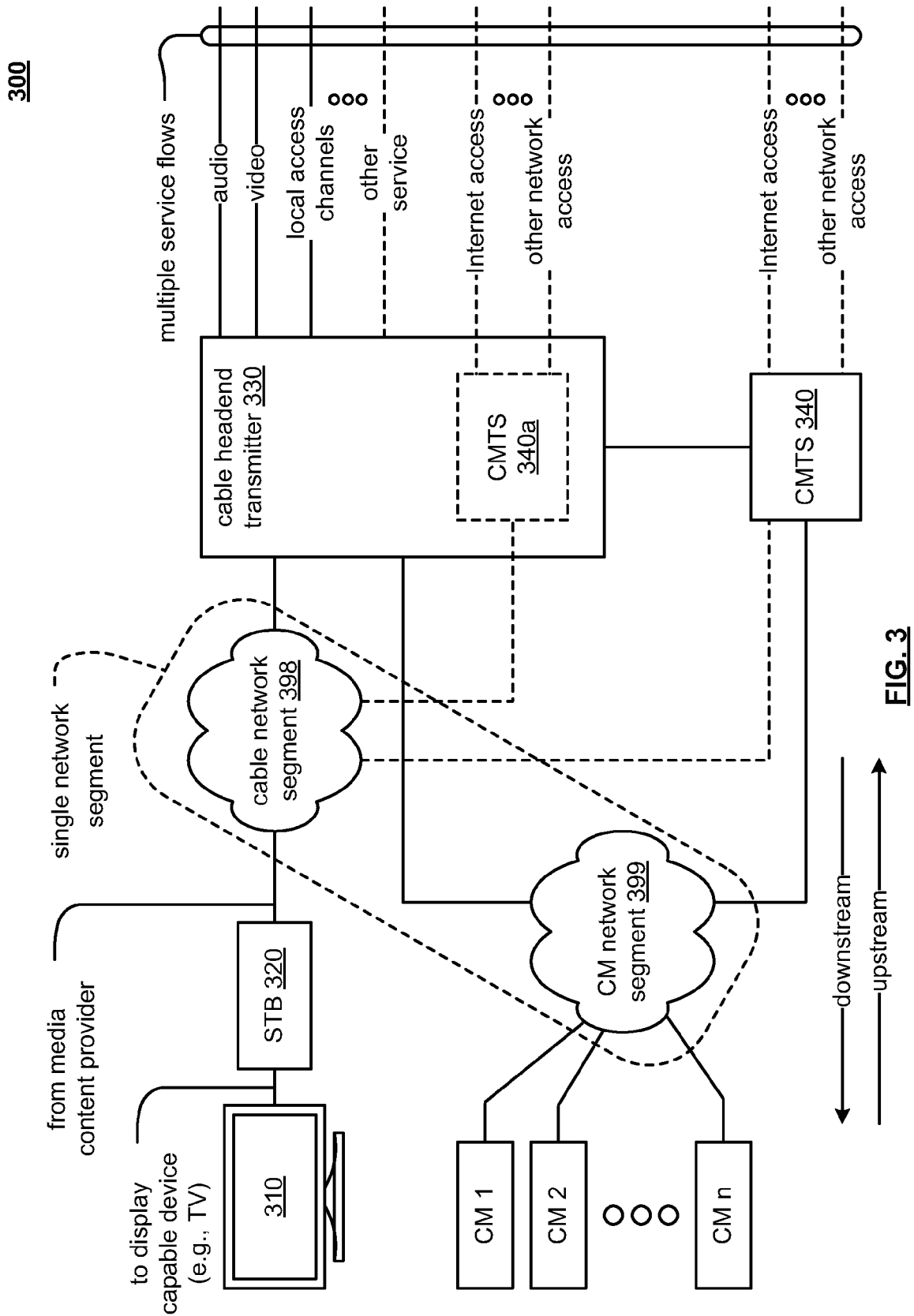

Referring to the communication system 300 of FIG. 3, this communication system 300 may be viewed particularly as being a cable system. For example, the communication system 300 includes a number of cable modems (shown as CM 1, CM 2, and up to CM n). A cable modem network segment 399 couples the cable modems to a cable modem termination system (CMTS) (shown as 340 or 340a and as described below).

A CMTS 340 or 340a is a component that exchanges digital signals with cable modems on the cable modem network segment 399. Each of the cable modems coupled to the cable modem network segment 399, and a number of elements may be included within the cable modem network segment 399. For example, routers, splitters, couplers, relays, and amplifiers may be contained within the cable modem network segment 399.

The cable modem network segment 399 allows communicative coupling between a cable modem (e.g., a user) and the cable headend transmitter 330 and/or CMTS 340 or 340a. Again, in some embodiments, a CMTS 340a is in fact contained within a cable headend transmitter 330. In other embodiments, the CMTS is located externally with respect to the cable headend transmitter 330 (e.g., as shown by CMTS 340). For example, the CMTS 340 may be located externally to the cable headend transmitter 330. In alternative embodiments, a CMTS 340a may be located within the cable headend transmitter 330. The CMTS 340 or 340a may be located at a local office of a cable television company or at another location within a cable system. In the following description, a CMTS 340 is used for illustration; yet, the same functionality and capability as described for the CMTS 340 may equally apply to embodiments that alternatively employ the CMTS 340a. The cable headend transmitter 330 is able to provide a number of services including those of audio, video, local access channels, as well as any other service of cable systems. Each of these services may be provided to the one or more cable modems (e.g., CM 1, CM 2, etc.). In addition, it is noted that the cable headend transmitter 330 may provide any of these various cable services via cable network segment 398 to a set top box (STB) 320, which itself may be coupled to a television 310 (or other video or audio output device). While the STB 320 receives information/services from the cable headend transmitter 330, the STB 320 functionality may also support bi-directional communication, in that, the STB 320 may independently (or in response to a user's request) communicate back to the cable headend transmitter 330 and/or further upstream.

In addition, through the CMTS 340, the cable modems are able to transmit and receive data from the Internet and/or any other network (e.g., a wide area network (WAN), internal network, etc.) to which the CMTS 340 is communicatively coupled. The operation of a CMTS, at the cable-provider's head-end, may be viewed as providing analogous functions provided by a digital subscriber line access multiplexor (DSLAM) within a digital subscriber line (DSL) system. The CMTS 340 takes the traffic coming in from a group of customers on a single channel and routes it to an Internet Service Provider (ISP) for connection to the Internet, as shown via the Internet access. At the head-end, the cable providers will have, or lease space for a third-party ISP to have, servers for accounting and logging, dynamic host configuration protocol (DHCP) for assigning and administering the Internet protocol (IP) addresses of all the cable system's users (e.g., CM 1, CM2, etc.), and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (EuroDOCSIS), the major standard used by European cable systems in providing Internet access to users, without departing from the scope and spirit of the invention.

The downstream information flows to all of the connected cable modems (e.g., CM 1, CM2, etc.). The individual network connection, within the cable modem network segment 399, decides whether a particular block of data is intended for it or not. On the upstream side, information is sent from the cable modems to the CMTS 340; on this upstream transmission, the users within the group of cable modems to whom the data is not intended do not see that data at all. As an example of the capabilities provided by a CMTS, a CMTS will enable as many as 1,000 users to connect to the Internet through a single 6 Mega-Hertz channel. Since a single channel is capable of 30-40 Mega-bits per second of total throughput (e.g., currently in the DOCSIS standard, but with higher rates envisioned such as those sought after in accordance with the developing DVB-C2 (Digital Video Broadcasting-Second Generation Cable) standard, DVB-T2 (Digital Video Broadcasting-Second Generation Terrestrial) standard, etc.), this means that users may see far better performance than is available with standard dial-up modems.

Moreover, it is noted that the cable network segment 398 and the cable modem network segment 399 may actually be the very same network segment in certain embodiments. In other words, the cable network segment 398 and the cable modem network segment 399 need not be two separate network segments, but they may simply be one single network segment that provides connectivity to both STBs and/or cable modems. In addition, the CMTS 340 or 340a may also be coupled to the cable network segment 398, as the STB 320 may itself include cable modem functionality therein.

It is also noted that any one of the cable modems 1, 2, . . . m n, the cable headend transmitter 330, the CMTS 340 or 340a, the television 310, the STB 320, and/or any device existent within the cable network segments 398 or 399, may include a memory optimization module as described herein to assist in the configuration of various modules and operation in accordance with any one of a plurality of protocols therein.

Various communication devices can operate by employing an equalizer therein (e.g., an adaptive equalizer). Some examples of such communication devices include those described herein, including cable modems (CMs). However, it is noted that various aspects and principles presented herein may be generally applied to any type of communication device located within any of a variety of types of communication systems. For example, while some illustrative and exemplary embodiments herein employ the use of a CM in particular, though it is noted that such aspects and principles presented herein may be generally applied to any type of communication device located within any of a variety of types of communication systems.

A communication device (e.g., a cable modems (CM)) may report its downstream equalizer coefficients via a management information base (MIB) query. The equalizer coefficients typically consist of at least one of feed-forward equalizer (FFE) and decision feedback equalizer (DFE) coefficients. Such equalizer coefficients can be used to estimate the channel response and an associated fidelity metric, such as in accordance with the approaches described within the various applications incorporated by reference above and entitled "System and method for linear distortion estimation by way of equalizer coefficients".

However, certain issues may arise when using the equalizer coefficients to estimate the channel response. For example, calculating the frequency response of an equalizer with both FFE and DFE sections is one possible issue. When in operation, the equalizer adapts to the total end-to-end channel. Hence, the equalizer response does not indicate only the response of a cable-plant channel (e.g., in the CM embodiment), which is the desired result, but also the response of the CM itself. For example, a narrowband analog front end (AFE) may exhibit significant amplitude ripple and group delay variation (GDV) versus frequency. In some embodiments such as characterizing the channel external to the receiver unit (e.g., such as for fault discovery within the network), it may be desirable to remove the effect of the CM response from the reported equalizer tap values. In addition, narrowband ingress (interference) signals may affect the equalizer tap values. Part of the characterization of the channel is to determine the ingress signal characteristics by processing the equalizer tap values, as well as other available data. A novel approach is presented herein by which the ingress can be characterized from the equalizer taps and distinguished from network distortion such as filtering or reflections (echoes), for example.

It is again noted that while the particular illustrative example of a cable modem (CM) is employed in a number of different embodiments, diagrams, etc. herein, such architectures, functionality, and/or operations may generally be included and/or performed within any of a number of various types of communication devices including those operative in accordance with the various communication system types, including those having more than one communication medium type therein, such as described with reference to FIG. 1.

A variety of architectures, functionality, and/or operations are described herein utilizing and analyzing various characteristics associated with equalizer coefficients. As will be understood with respect to various embodiments herein, various embodiments may include either one or both of a feed forward equalizer (FFE) and a decision feedback equalizer (DFE). As few as one tap or a plurality of tabs may be implemented within a FFE or a DFE. A processor (e.g., processing module, circuitry, baseband processor, and/or other processor device, etc.) may be implemented to analyze various characteristics associated with one or more signals process within a communication device including respective equalizer coefficient values, frequency response of any such signals, etc. in various implementations and for various reasons. For example, comparison of a first one or more equalizer coefficients with a second one or more equalizer coefficients and/or a third one or more equalizer coefficients may be employed to assist in identifying a residual frequency response of an equalizer. In addition, other embodiments may operate to assist in identifying the frequency response of a communication channel via which a signal is received by a device including one or more such equalizers. Also, by analyzing the various equalizer coefficients and/or any changes thereof, such determination of the residual frequency response of such an equalizer, the identification narrowband ingress (e.g., interference having generally narrowband characteristics), the amount and/or degree of such narrowband ingress, as well as other operational parameters and/or characteristics may be determined.

In certain of the following diagrams, various implementations of one or more equalizers are described with respect to a number of possible embodiments.

Figure 4:
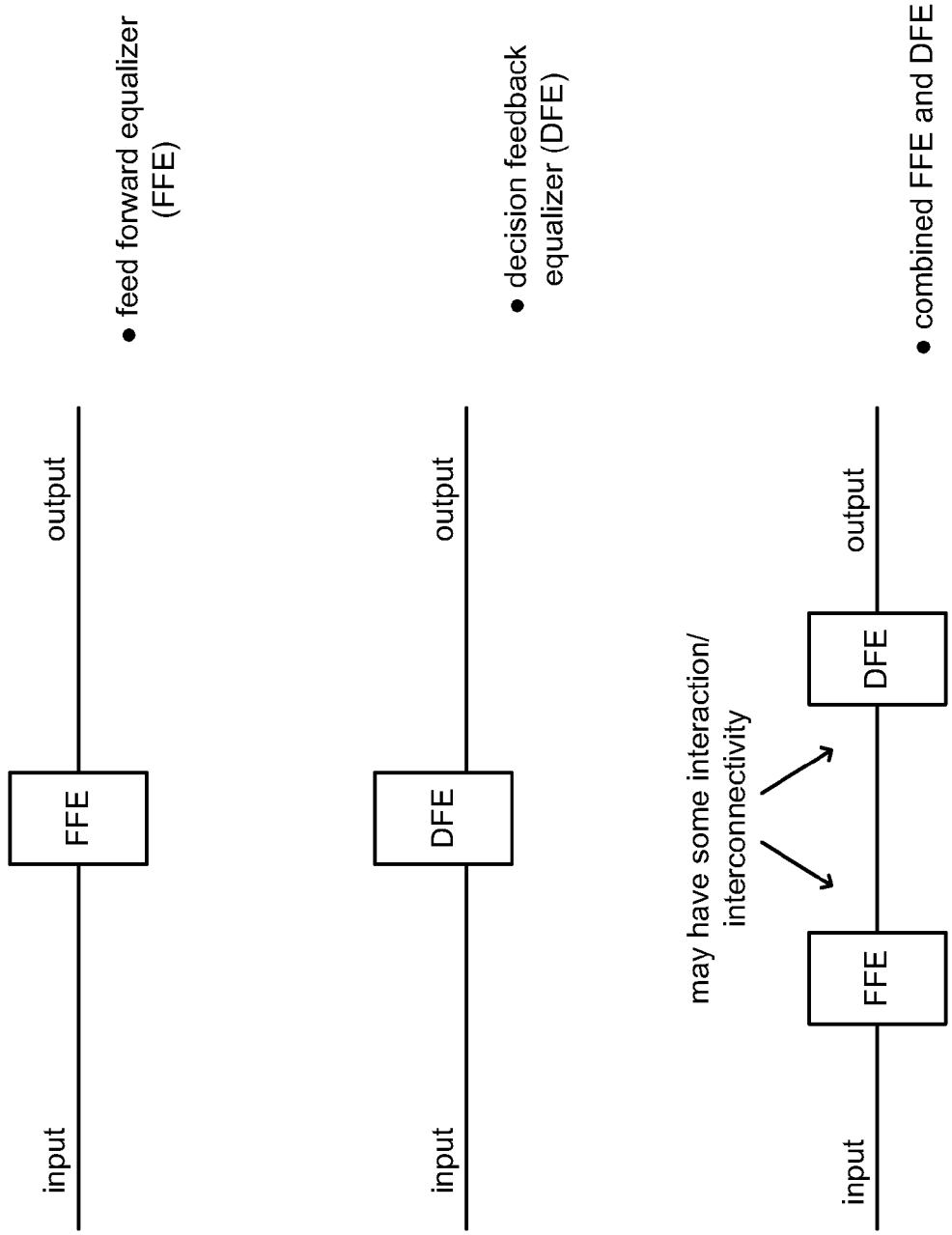
FIG. 4 illustrates an embodiment of various implementations of equalizers as may be included within a communication device.

FIG. 4 illustrates an embodiment 400 of various implementations of equalizers as may be included within a communication device. New top of this diagram, a singularly implemented feed forward equalizer (FFE) is shown as processing an input signal thereby generating an output signal. In the middle of the diagram, a singularly implemented decision feedback equalizer (DFE) is shown as processing an input signal thereby generating an output signal.

At the bottom of the diagram, a combination of an FFE and a DFE are cooperatively shown as processing an input signal thereby generating an output signal. Generally speaking, the output of the FFE may be viewed as being a first processed signal, and the input to the DFE may be viewed as being the first processed signal or a signal corresponding to the first processed signal, and the output signal from the DFE may be viewed as being a second processed signal. As may be understood with respect to certain of the various embodiments provided herein, in architectures including both an FFE and a DFE, there may be a certain degree of interaction and/or inter-connectivity between the FFE and the DFE, in that, certain signals are provided there between in accordance with their combined processing of the input signal thereby generating the output signal.

It is noted that any such desired embodiment of an FFE, a DFE, or a combination of an FFE and a DFE may be included within any desired communication device without departing from the scope and spirit of the invention.

Figure 5:
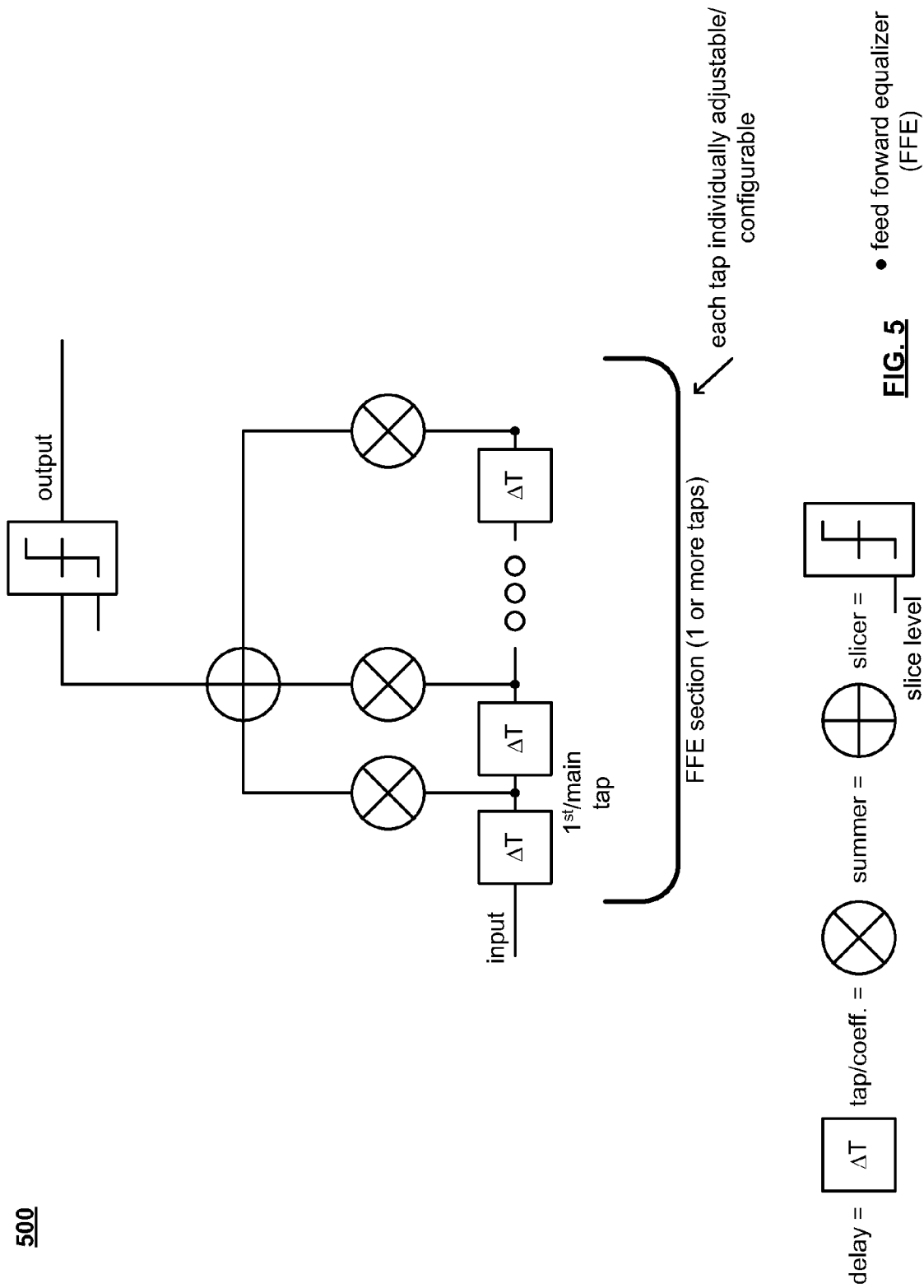
FIG. 5 illustrates an embodiment of a feed forward equalizer (FFE).

FIG. 5 illustrates an embodiment 500 of a feed forward equalizer (FFE). This diagram illustrates an FFE including one or more taps. In accordance with such operation of an FFE, such an equalizer may generally be viewed as being a filter (e.g., a finite impulse response filter) that includes a series of tap weights or coefficients that may be programmed to adjust the impulse and/or frequency response of the signal output there from. As may be seen with respect to the diagram, an input signal is provided to a delay line including one or more respective delay blocks, and the respective one or more outputs there from may be viewed as those signals that undergo multiplication by the one or more equalizer coefficients or taps. After undergoing appropriate multiplication by the one or more equalizer coefficients or taps, these resulting signals are combined (e.g., within an adder or summer device) and are provided to a slicer. With this embodiment as well as others described herein, it is noted that any of a number of respective operational parameters associated with such an equalizer may be individually adjustable/configurable. For example, each of the respective equalizer filter coefficients or taps may be adjusted during operation. Also, the respective slice level employed by the slicer may be adjusted as well.

Figure 6:
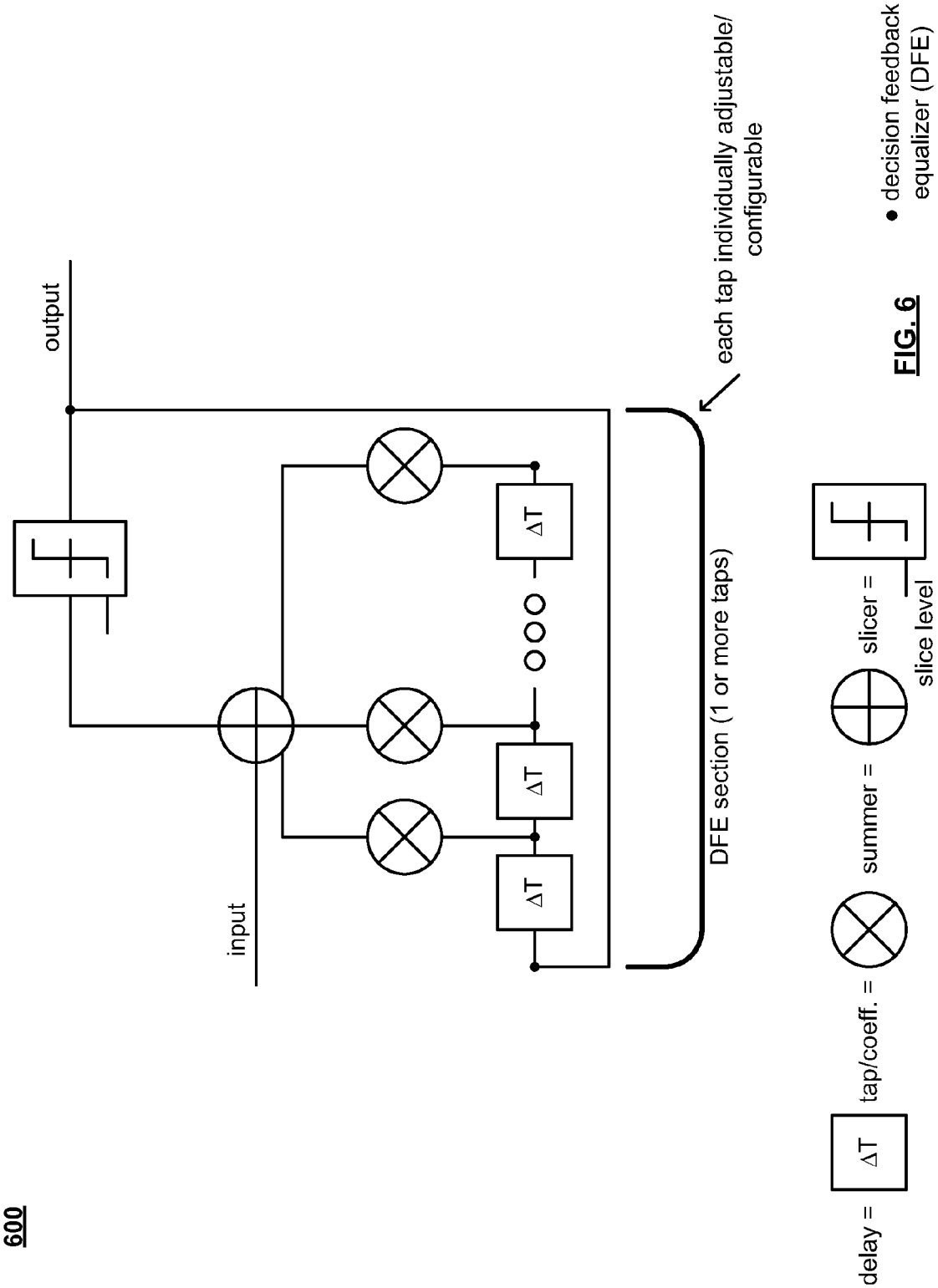
FIG. 6 illustrates an embodiment of a decision feedback equalizer (DFE).

FIG. 6 illustrates an embodiment 600 of a decision feedback equalizer (DFE). This diagram illustrates a DFE including one or more taps. In accordance with such operation of a DSP, such an equalizer may generally be viewed as processing a signal output from a slicer. For example, the input to the delay line of such a DFE corresponds to the one or more decisions (e.g., actual hard decisions made by the slicer). The output from the slicer is provided to the beginning of a delay line including one or more respective delay blocks, and the respective one or more outputs there from may be viewed as those signals that undergo multiplication by the one or more equalizer coefficients or taps. In accordance with such operation of a DFE, these resulting signals are combined together as well as combined with the input signal provided to the DFE (e.g., within an adder or summer device); the resultant summed output signal (e.g., from such an adder or summer device) is then provided as an input to the slicer whose output signal is fed back to the input of the delay line of the DFE.

Figure 7:
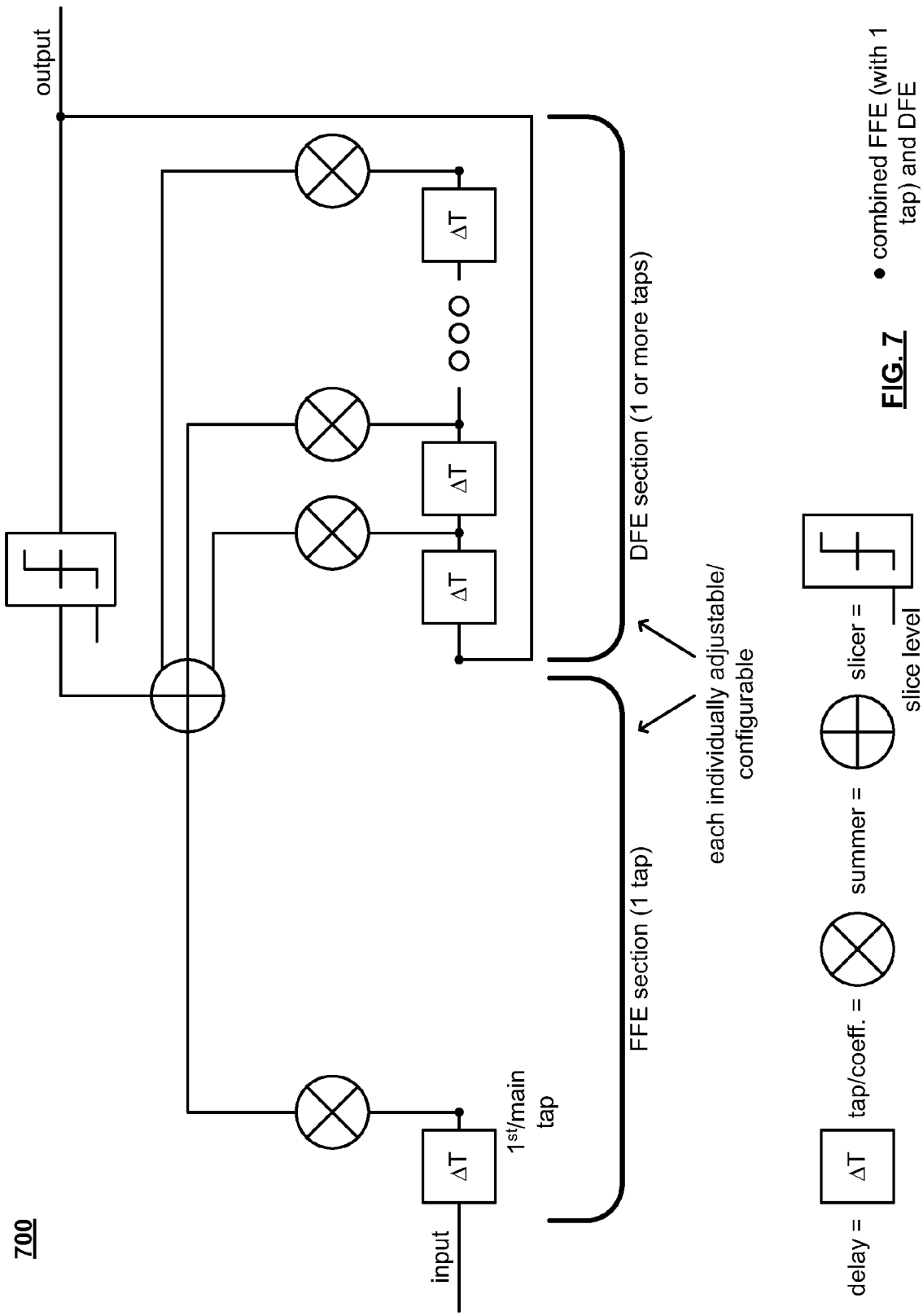
FIG. 7 illustrates an embodiment of a combination of an FFE having one tap with a DFE.

FIG. 7 illustrates an embodiment 700 of a combination of an FFE having one tap with a DFE. As may be understood with respect to this diagram as well as certain of the following diagrams, an FFE section may be combined with a DFE section in a particular embodiment of an equalizer. For example, with respect to this diagram, an FFE section including a single tap is combined with a DFE section including one or more taps. As may be seen with respect to the combining element (e.g., adder or summer device) located approximately in the top center of the diagram, the output from the FFE section is combined with the resulting signals output from the equalizer coefficients or taps from the DFE section.

Figure 8:
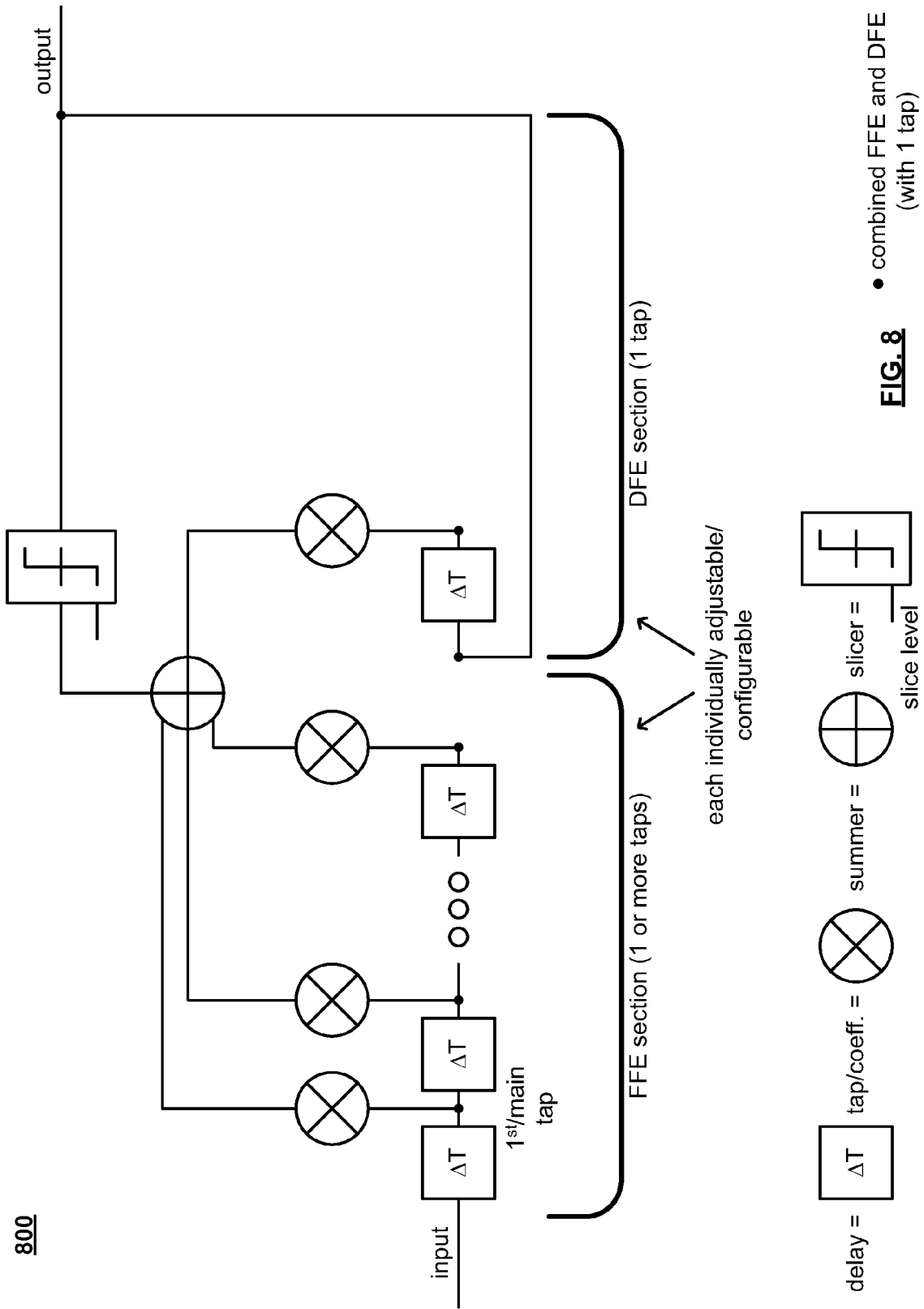
FIG. 8 illustrates an embodiment of a combination of an FFE with a DFE having one tap.

FIG. 8 illustrates an embodiment 800 of a combination of an FFE with a DFE having one tap. Again, as described above, an FFE section may be combined with a DFE section in a particular embodiment of an equalizer. For example, with respect to this diagram, an FFE section including one or more taps is combined with a DFE section a single tap. As may be seen with respect to the combining element (e.g., adder or summer device) located approximately in the top center of the diagram, the feedback signal portion from the singular equalizer coefficient or tap from the DFE section is combined with the resulting signals output from the equalizer coefficients or taps from the FFE section.

As may be understood with respect to the architecture and implementations corresponding to a combination of an FFE and a DFE, there can be a certain degree of interaction and/or interconnectivity between and FFE section and a DFE section of an equalizer including both.

Figure 9:
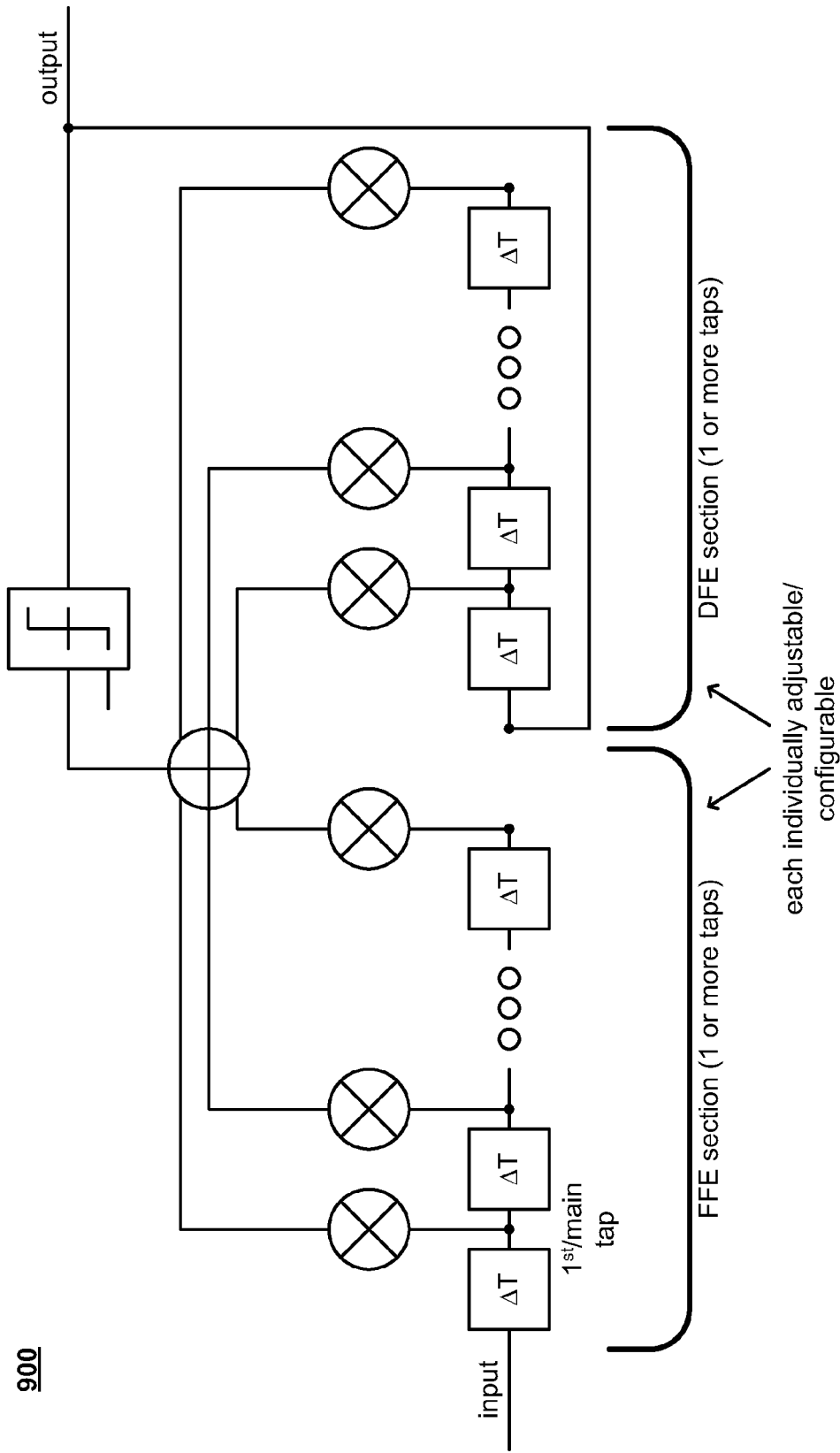
FIG. 9 illustrates an embodiment of a combination of an FFE with a DFE (e.g., each respectively having one or more taps).

FIG. 9 illustrates an embodiment 900 of a combination of an FFE with a DFE (e.g., each respectively having one or more taps). In this particular embodiment of an equalizer including both an FFE section and a DFE section each respectively including more than one tap, as may be seen with respect to the combining element (e.g., adder or summer device) located approximately in the top center of the diagram, the respective resulting signals output from the equalizer coefficients or taps from the FFE section are combined with the resulting signals output from the equalizer coefficients or taps from the DFE section. With respect to such an implementation of an equalizer, from certain perspectives, there is a relatively larger degree of interaction and/or interconnectivity between and FFE section and a DFE section.

Within any such desired implementation of an equalizer including an FFE section and a DFE section respectively, independent adjustment and/or configurability of the respective equalizer coefficients of those respective sections may be made. That is to say, any of the individual operating characteristics associated with either the FFE section or the DFE section may be independently adjusted.

FIG. 10 illustrates an embodiment 1000 of respective notches or incursions within respective FFE and DFE sections of a communication device. Generally speaking, and embodiments including both an FFE section and a DFE section, those respective equalizer sections operate cooperatively with one another in an effort to perform equalization and/or other processing of one or more signals. For example, in the context of such an equalizer being implemented within a receiver communication device (e.g., or analogously or equivalently within the receiver portion of a transceiver communication device), such equalization may be performed in an effort to compensate for or undo any deleterious effects incurred by a signal received by such a device. For example, when such a signal traverses one or more communication links within one or more communication networks and/or systems, there may be certain degradation of the signal.

With respect to the diagram, the processing associated with an FFE section may be viewed as sometimes generating a notch or incursion (e.g., with respect to the frequency response of such a signal being processed), in the processing associated with a DFE section may be viewed as sometimes generating a notch or incursion generally in the opposite direction. Such respective notches or incursions need not necessarily be identical in shape or magnitude. That is to say, such frequency response effects within an FFE section may be relatively different than such frequency response effects within a DFE section.

As may be seen with respect to this diagram, in instances in which a notch or incursion exists or is introduced within the FFE section, and in which the effect of such a notch or incursion is compensated for or eliminated within the DFE section, the existence of any narrowband ingress may be identified. Also, based upon particular values associated with such equalizers (e.g., the particular equalizer coefficient values and/or changes thereof within one or both of the FFE section or the DFE section), the relative amount or degree of narrowband ingress may also be identified.

For example, when taken together, if the combined frequency response of the FFE section in the DFE section provides a relatively overall flat frequency response (e.g., such as within some desired tolerance, constraint, etc.), then narrowband ingress may be viewed as being identified within the signal provided to the equalizer. Generally speaking, such a frequency response will not be perfectly or exactly flat. A designer is provided a wide degree of latitude to make a determination or assessment regarding whether or not the frequency response is substantially or approximately flat within any such desired tolerance, constraint, etc. (e.g., such as flat within a percentage of 5%, 3%, and/or any other desired tolerance, constraint, etc.).

For example, considering operation of the FFE in instances in which an input signal may have a certain degree of narrowband interference therein, a notch or incursion may be introduced to compensate for such interference. Any noise existed within the signal processed by the FFE is then passed there through to the DFE. The DFE may then be operative to invert the notch or incursion created by the FFE (e.g., peaking may be employed within the DFE to compensate for the notch or incursion associated with the FFE). By analyzing the particular frequency response of the signal output from the DFE section of the equalizer, the identification of narrowband ingress within the signal provided to the equalizer may be made. In addition, based on the equalizer coefficients themselves (or any changes thereof) in accordance with performing such processing, such narrowband ingress may also be identified.

There may be certain instances in which one or more equalizer coefficient values may deliberately be modified in order to track or monitor the relative effect caused thereby. For example, a notch or incursion may be deliberately introduced within an FFE that may create some inter-symbol interference (ISI) or inter-code interference (ICI). In certain embodiments, different respective equalizer coefficient values are modified successively in order to track or monitor the relative effect caused by their respective changes. That is to say, any one or more equalizer coefficient value may be modified such that analysis of a signal output from the equalizer may be made in order to determine a change of the frequency response of the equalizer (e.g., of the FFE section in the DFE section). It is noted that different respective modifications of such equalizer coefficients may be made in an effort to enhance further identification of narrowband ingress and/or to identify more than one source of narrowband ingress. For example, in certain situations, there may be more than one source of narrowband ingress that deleteriously affects a signal. By intelligently and successively modifying respective equalizer coefficients and monitoring their respective effects, identification of one or more sources of narrowband ingress may be made.

Computing the Frequency Response of FFE/DFE Taps

A novel approach for computing the frequency response of the equalizer taps is presented herein. This response, when inverted, gives an approximation of the overall end-to-end channel response. In accordance with the approaches described within the various applications incorporated by reference above and entitled "System and method for linear distortion estimation by way of equalizer coefficients", estimation of the end-to-end channel response from the receiver equalizer response, with higher accuracy than simple inversion, can be performed.

The equalizer structures under consideration here include both a feed forward section (FFE) and a decision feedback section (DFE). The equalizer tap coefficients represent the time domain equalizer response and can in theory be used to represent the equalizer in a time domain difference equation, and transform techniques can be used to convert the time domain difference equations into the equalizer frequency response.

The FFE coefficients can contain a scale factor which compensates or adjusts for gain or loss factors all along the channel and including within the receiver itself, and including the effect of the DFE coefficients; also the overall scaling of the equalized and filtered signal into the slicer adjusts with the signal-to-noise and distortion ratio of the signal presented to the slicer and this scaling adjustment is incorporated into the FFE coefficients. For practical purposes, it is useful to perform a scaling of the FFE coefficients as an early step in manipulating these coefficients for the purposes here, and one suitable such scaling is to normalize the total power of the FFE coefficients to unity similar to as taught in the referenced US patent. FFE coefficients may alternatively be referred to as FFE taps, scaled or otherwise.

On the other hand, the DFE coefficients obtained from the adapted equalizer do require a critical scaling adjustment immediately, in general. This scaling is necessary for properly placing the DFE coefficients into the time domain difference equation which represents the DFE. The DFE is a monic feedback filter with an implicit unity coefficient for the lead term (e.g., $1 \times y(n) = c_1 \times y(n-1) + c_2 \times y(n-2) + \ldots c_M \times y(n-M)$ for a DFE with M taps), and the DFE tap delay line coefficients correspond to the one delay, two delay, etc., coefficients in the monic difference equation. In practice, the coefficients implemented in the DFE multipliers operate on the slicer outputs and are used to provide inputs back to the slicer, and as such these coefficients when they are adapted within the equalizer operation naturally compensate for scaling differences (e.g., binary point differences between the interpretation of the digital words input to the slicer compared to the digital words output from the slicer, and/or precise implementation of the multipliers operating in the DFE implementation).

Therefore, the actual coefficients existing in the DFE implementation will in general be $c\tilde{\ }_m$, and will differ from the true inherent difference equation coefficients $c_m$ by a scaling factor such that $c_m = (\text{DFE scale factor}) \times c\tilde{\ }_m$, for each m=1 to M in the DFE. It is noted that, in general, it could be that differences among the multipliers in the DFE implementation would result in a different DFE scale factor among one or more of the M DFE coefficients, and if so the different such scale factors would have to be known or discovered. One such reason for differences in implementation of tap multipliers may be cognizance that certain taps may require more headroom than others, and/or that more precision is required for some taps than others, and so forth. For purposes of this teaching it is assumed henceforth that there is one DFE scale factor common to all DFE coefficients, but the application of the various aspects and principles here to implementations with more than one DFE scale factor may be understood by the reader. The DFE scale factor may be learned by analysis of the implementation and/or by empirical means, or a combination thereof, as is also explained below. The DFE scale factor is determined and applied to adjust the obtained DFE coefficients. The coefficients $c_m$ are referred to henceforth as the true, scaled DFE coefficients, and also simply as the true DFE coefficients or the DFE coefficients or the DFE taps. The obtained DFE coefficients from the equalizer, $c\tilde{\ }_m$, will be referred to henceforth as the implemented DFE coefficients or the obtained DFE coefficients.

In lieu of, or in conjunction with, analysis of the design of the slicer and DFE word handling implementation, empirical means may provide the DFE scale factor. For example, a test with the receiver and transmitter with flat channel in between may be operated, yielding a baseline equalizer result with presumably fairly insignificant, low magnitude obtained DFE coefficients. Then, the test is modified with an echo of delay corresponding to a known integer number of symbol times and known attenuation compared to the undelayed and undistorted main transmission path. Then, the obtained DFE coefficients are examined; the value of the true DFE coefficient in the DFE tap corresponding to the duration of the echo delay should have magnitude equal to the ratio of the echo amplitude over the main path amplitude. Thus the true DFE coefficient for the tap corresponding to the echo delay can be calculated from the test setup or from measurement of the test signals input to the receiver, and the ratio of the true DFE coefficient magnitude divided by the obtained coefficient magnitude yields the DFE scale factor for the tap corresponding to the echo delay. If all DFE taps are implemented with the same scale factor, then this design information combined with the empirically measured DFE scale factor provides the DFE scale factor for all the DFE taps. If the DFE scale factor can be empirically measured for each tap, or fewer measurements may be combined with design knowledge to deduce the DFE scale factor for each tap, or such measurements may be used to confirm previously derived analytical values for the DFE scale factor. Redundant tests for calculating DFE scale factor may be beneficially employed to increase confidence in the determination. As an example of the empirical approach for determining DFE scale factor, an echo with delay of three symbol durations and power −12 dB compared to the main path (i.e., $\frac{1}{4}^{th}$ the magnitude) yielded an "obtained DFE coefficient" on the third DFE tap which was originally interpreted as −5.5 dB, or 0.531 in amplitude. Taking the ratio of the calculated true DFE coefficient (0.25) with the "obtained DFE coefficient" (0.531) yields a DFE scale factor of 0.471. This empirically derived DFE scale factor is adjusted to exactly 0.5, or ½, based on analytical factors. An additional empirical test was run with the same echo delay and −18 dB attenuation of the echo compared to the main path, and the obtained DFE coefficient reduced 6.0 dB, as expected. Additional tests with other echo delays and −12 dB and −18 dB echo amplitudes compared to the main path yielded similar results for the DFE scale factor.

Thus, both FFE and DFE coefficients are normalized by respective constants. For example, in the numbering system of one embodiment CM, with 16-bit tap values ranging from $-2^{\wedge}15$ to $2^{\wedge}15-1$, via the empirical method and analysis, it was determined to divide all obtained DFE coefficients by $2^{\wedge}14=16384$. In this numbering system, an un-normalized coefficient value of 16384 corresponds to a normalized coefficient value of 1. With this normalization, the "1" value can be used properly in the following Matlab equation.

Assumptions:
DFE sign convention: Assume DFE output is added to (not subtracted from) FFE output before slicer (chip dependent).
DFE tap coefficient scaling: Assume the DFE tap coefficients have been properly normalized, so that a single 0 dB channel echo at a multiple of the symbol period, will produce a single DFE tap with amplitude 1.
Tap notation: FFE taps=hffe, DFE taps=hdfe.
With the above assumptions, FFE/DFE frequency response in Matlab notation is:

FFE/DFE frequency response=fft(hffe)./fft([1,-hdfe])
This means:
For numerator, take N-point FFT of FFE taps (for example, N=256).
For denominator, negate the DFE taps, pre-pend a 1 in front as a extra "tap 0", then take N-point FFT (use same N as for FFE).
Divide (point by point complex division) the numerator/denominator to get combined FFE/DFE equalizer response.

A final normalization of the combined FFE/DFE response to unit power is recommended. It is noted that although the FFE portion of the response was (perhaps) normalized to unit power, after application of the DFE portion of the response the combined response may no longer be unit power.

Similar steps to those above can be implemented in Excel spread sheets or using other mathematical evaluation tools. The magnitude of the equalizer response can then be plotted using any desired graphing capability. Determination of the phase and group delay of the equalizer response requires some additional steps in order to avoid misleading and non-useful results. These steps are detailed below. The channel response is approximately the inverse of the equalizer response, assuming a high signal to noise ratio (SNR). Obtaining more accurate estimation of the channel response from the equalizer response, beyond mere inversion of the equalizer response, is detailed in the referenced US patent.

In order to obtain the proper phase and group delay response of the equalizer, and thus also an estimate of the channel response, delay or phase tilt is backed out of the phase response in general. For example, by applying a standard FFT operation with the first tap of the FFE corresponding to the first time domain sample there is a time-shift introduced corresponding to the empirically known information that a later tap in the FFE corresponds to "the main tap" or "center tap". Such a time-shift introduces significant phase tilt into the phase portion of the frequency response, and this phase tilt proves problematic with most available analysis tools such as Matlab or Excel, requiring some additional steps to obtain results useful for system analysis. The FFE taps could be cyclically rotated prior to the FFT operation to align the center tap of the FFE with the time origin of the FFT operation being employed. If the center tap of the FFE is too far from the first tap of the FFE, then it may be necessary to perform some amount of cyclic rotation of the FFE taps at the input to the FFT in order for the following steps prove successful.

Even with the possible modification to the procedure outlined above (cyclic rotation of FFE taps to more properly align the center tap of the FFE to the time origin of the FFT), the following subsequent steps should generally be employed for phase or group delay determination. It is noted that usable phase information (unwrapped and tilt removed) is developed after the group delay response is calculated. The first step for finding group delay information from the equalizer response is to calculate phase differences of adjacent samples in the frequency domain (e.g., the results of the complex division of the FFE and DFE FFT results). This phase difference calculation is performed modulo one cycle (or $2\times\pi$ radians, or 360 degrees), with range oriented from $-\frac{1}{2}$ cycle to $+\frac{1}{2}$ cycle (or −180 degrees to +180 degrees, etc.) in a favored embodiment. If the evaluation tool in use provides an orientation from a modulo calculation which ranges from 0 to 1 cycle (or 0 to 360 degrees), then the modulo calculation should be modified or adjusted to provide the previously noted range, or one of the following steps may be employed. One embodiment which involves a modulo function with non-negative range can employ multiplication by "−1" prior to the modulo operation; the result can be multiplied by negative one "−1" again, resulting in a non-positive range, or an ensuing multiplication by negative one (in the following steps) can simply be eliminated. Another possible embodiment uses subtraction of one full cycle (or 360 degrees, etc.) to provide range of −1 cycle to 0 cycles (or −360 degrees to 0 degrees, etc.). Another means of adjusting the range is subtracting $\frac{1}{2}$ cycle (or 180 degrees) from each modulo difference result, but use of this step will mean a necessary analytical adjustment after the otherwise final step below. Adding an amount such as $\frac{1}{2}$ cycle prior to the modulo operation, and then subtracting this amount after the modulo operation, effectively changes the "cut" of the modulo operation without requiring any additional adjustment to the final results, and also positions the resulting range to include negative phase differences (which is generally desired and the reason for invoking one of the above steps). Changing the "cut" in the modulo operation may nor may not be needed. If one or several, especially nearly periodic, large discontinuities appear in the modulo phase difference results then changing the "cut" in the modulo operation (by adding an offset prior to the modulo function and subtracting the offset after the modulo function, as described above) may be warranted.

The modulo differencing of the phases of adjacent frequency response samples is achieving an unwrapping of the phase of the equalizer frequency response, which is necessary in general due to the phase tilt which is incorporated into the obtained frequency response from the preceding steps (e.g., displaced center tap within the FFT operation for the FFE). It is noted that some equalizer implementations may intend for a particular tap to be "the main tap", but the adapted coefficients may present a different effective main tap.

If there is a large amount of group delay variation in the channel, even the preceding steps may not provide sufficient unwrapping of the phase; inadequate unwrapping of the phase manifests itself in phase difference results which have one or more large discontinuities (or glitches) across the frequency samples. Adjusting the "cut" as described above is a simple approach to obtaining phase difference results which do not contain glitches due to problematic unwrapping; adjusting the "cut" to reduce the variation in the phase difference results across the frequency samples is recommended in the presence of phase difference glitches.

After obtaining the modulo phase differences the phase difference results are normalized by a "delta freq" denominator term to generate the group delay variation, and multiplication by "−1" is incorporated (by definition of group delay variation) if it has not been applied in a previous step. Maintaining units of delta ($\Delta$) phase as "radians", and units of delta frequency for the adjacent frequency samples as "radians/sec" yields group delay variation in units of "seconds". Dividing this result by the duration of the symbols yields group delay variation in units of "symbol duration". Typically the group delay variation at this point will contain a fairly significant "DC bias" and in a favored embodiment the average of the group delay variation is computed and subtracted to present a zero mean group delay variation, and the average which was subtracted is reported along with the "zero-mean" variation of the group delay about that average. From this point, undoing the normalizations which resulted in changing the units from radians to seconds or symbol duration, and removing the multiplication by "−1", or by equivalent means, the zero-mean group delay variation is integrated to recover the unwrapped phase response, with the tilt component removed. It is noted that the tilt component in the phase response corresponds to the mean of the group delay variation which was subtracted to obtain the zero-mean group delay variation response.

Removing the Effect of the Receiver Communication Device (e.g., CM) Internal Response from the Reported Equalizer Tap Values This removal may be done in the time or frequency domains. First, the approach in the frequency domain is described. Again, while a CM is used for illustrative and exemplary purposes, such aspects and principles may be employed within any type of communication device.

As an example, we may capture the equalizer taps of a CM at three different frequency cases: 111 MHz, 489 MHz, and 855 MHz. In other embodiments captures of the CM adapted equalizer with ideal channel and near-ideal transmitter are performed at a plurality of channel center frequencies covering the full range of frequency operation of the CM receiver, with different symbol rates and input power levels and any other mode or setting differences for the CM which may alter its physical characteristics as a receiver. The resulting frequency responses for these different conditions can be compared, or stored, or both; comparison may result in a single baseline frequency response with deltas computed against the baseline, or perhaps a subset of the responses over all the variations may be stored in some fashion to adequately represent the CM response across the plurality of conditions. A criterion such as total error power (or difference power) between two responses (both normalized to unit power) can be used to determine "goodness of fit". As an alternative, a weighted error power can be computed between two responses, weighted by the power spectral density of the theoretical transmission spectrum, as an example. At least one CM equalizer response is captured and retained as a baseline response (e.g., before the communication device is ever installed or operational within a communication system).

When in actual operation in a test or in the field, equalizer response can be captured and determined as in the preceding section, and the appropriate baseline response of the CM can be removed from the just-captured response as described below. This residual equalizer response is approximately the inverse of the channel frequency response, with the effects of the CM removed. This step of computing the residual response, by essentially removing the CM baseline response, is especially useful in gauging the channel response from the CM equalizer when the implementation of the CM allows less-than-ideal performance which is allowable because the powerful equalization is known to be applied.

The removal of the baseline equalizer response from the just-captured equalizer response is described below. Essentially, the normalized complex frequency responses are divided, with the just-captured response in the numerator. The resulting quotient response may benefit from renormalization to unit power. An alternative embodiment performs the division of unit power normalized frequency responses dividing the FFE portion of the just-captured response by the appropriate baseline FFE response, and similarly dividing the frequency response of the just-captured DFE by the frequency response of the appropriate baseline DFE response. The quotient FFE response should be unit power normalized, and the quotient DFE response should be inverse transformed and scaled such that it is monic in the time domain. Elimination (truncation) of time domain values which are beyond the span of the implemented equalizer should be removed in both the residual FFE and DFE results. The FFE values should again be normalized to unit power. These time domain values (FFE and DFE coefficients) represent the residual equalization.

Converting to the frequency domain from these values represents another version (different than the aforementioned version) of the residual equalization. This latter version is in the frequency domain but corresponds to an equalization which is "implementable" with the span of the actual CM equalizer.

The following provides a description of an example of calculation of a baseline CM frequency response with a particular embodiment.

Convert the taps for each case to a frequency response using the formula for "FFE/DFE frequency response" given above. For the phantom "1" DFE tap in the denominator, use 16384; this is assuming that for the given CM implementation, the number 16384 corresponds to 1, and 4096 corresponds to ¼ or −12 dB. Complex numbers in representing the frequency response, that is, real and imaginary values are kept. As a normalization procedure, all 3 responses are divided by the 489 MHz response, using complex-number division. The amplitude and group delay is plotted versus frequency. The plots for the 489 MHz case will come out perfectly flat since the 489 MHz case is being used as the reference response, that is, the numerator and denominator are identical. The other two responses may also come out close to flat, indicating that the change of the CM response over frequency is not too significant.

Now that the baseline "self-response" of the CM has been removed by the above normalization procedure, the approach operates by applying a reflection in the communications channel. The CM equalizer taps will respond to the channel, and since the CM self-response has been removed, the channel response will be clearly visible.

To perform the above normalization in the frequency domain, polynomial multiplication and division (convolution and de-convolution) can be used instead of FFT processing. The result will be similar regardless of the mathematical approach taken for the computations.

Estimating Narrowband Ingress can be Characterized from the Equalizer Taps

This approach consists of the following operations and steps. First, the main FFE tap is moved to the left, resulting in post-cursor taps which overlap with the first few DFE taps. For example, consider an equalizer with 40 total taps, of which there are 16 FFE taps and 24 DFE taps. Further, consider that the main tap of the FFE is set at tap 13, so that there are 3 post-main-tap taps in the FFE. These are FFE taps 14, 15, and 16, and they correspond to one delay, two delays, and three delays after the main tap. The first three taps of the DFE also correspond to one delay, two delays, and three delays following the main tap. These DFE taps are numbered 17, 18, and 19 in this example, although they correspond to the same delays compared to the main tap as do the last three FFE taps numbering 14, 15, and 16.

If the channel has an echo at 3 T, then either tap 16 (the $3^{rd}$ FFE tap after the main tap) or tap 19 (the $3^{rd}$ DFE tap) can be excited by the communication channel, or a combination thereof. It doesn't matter what the combination is, as long as the resulting response equalizes the channel.

However, under a wide range of conditions, the adaptive equalizer will adapt to a least squared error solution. The FFE taps involve shaping the filtering of both the signal-of-interest and noise feeding into the slicer, but the DFE taps will "repair" or undo the effects of the inter-symbol interference caused by corresponding FFE post-main-tap taps, without adding (or subtracting) noise into the slicer (ignoring the impact of feedback decision errors for the purpose of this discussion). Thus FFE post-main-tap taps may adapt to reduce the noise power passed into the slicer, and the "damage" done by creating inter-symbol interference due to the filtering effect on the signal-of-interest by these FFE taps may be repaired via growth (or change) in the DFE taps. While this makes it appear at first that a large amount of FFE post-main-tap energy may develop in order to notch out a lot of noise, and the "cost" in signal distortion is largely negligible due to the healing of the DFE, in fact with AWGN (additive white Gaussian noise) the increase of any tap magnitude from zero only increases the noise power into the slicer. Therefore, with AWGN input to the receiver it is not expected that overlapping FFE and DFE taps will generally cause FFE energy to develop. If the noise into the receiver is not AWGN, then it is possible that nonzero FFE post-main-tap taps may serve to reduce the noise power into the slicer, and the presence of the overlapping DFE taps will allow the corresponding FFE taps to grow to reduce noise power into the slicer without introducing significant inter-symbol interference, because the inter-symbol interference from these FFE taps is mitigated by corresponding change in the DFE taps. Non-AWGN may arise in practice when AWGN sources are followed in the network by filtering, and/or followed by echoes, and especially ingress energy introduces non-flat noise. In the many applications, some portion of the noise accompanying the signal is in fact not spectrally flat.

Another factor in the tradeoff of FFE versus DFE taps is a result of the leakage applied to the various sections of the equalizer. More leakage on the FFE post-taps will cause them to be small, and the DFE will pick up the slack and have larger coefficients. Conversely, less leakage on the FFE post-taps allows them to be larger, and the DFE will tend to have smaller coefficients on the redundant taps.

When narrowband ingress interference occurs, the post-cursor taps will adapt to form a notch in the frequency domain. The DFE taps will adapt to cancel (undo) that notch, but operating on the signal after the slicer, so the slicer will benefit from the notch in terms of reducing the ingress power fed into the slicer.

In the example provided, the post-cursor FFE taps numbered 14-16 are normally kept near zero via leakage. However, when a narrowband interferer is present in the channel, taps 14-16 will assume relatively large values, in order to construct a notch in the frequency domain. This notch will attenuate the narrowband interferer. However, the notch will also cause distortion of the desired signal. The corresponding DFE taps numbered 17-19 will then adapt to remove this distortion. The net result is the removal of the narrowband interference with little or no distortion of the desired signal.

The above action will result in an identifiable signature in the FFE/DFE taps that can be used to detect and characterize narrowband interference. The following processing may be done in this regard:

The presence of energy in the FFE post-cursor taps above a predetermined threshold is an indication of the presence of narrowband interference.

The frequency response of the FFE, including all taps including the post-cursor taps, will show a notch at the frequency of the narrowband interferer. The frequency of this notch can be measured, and will provide an estimate of the frequency of the interferer.

The depth of the notch in the frequency response of the FFE, including all taps including the post-cursor taps, will provide an estimate of the amplitude of the interferer relative to the desired signal.

In some implementations there may be a large number of post-cursor FFE taps, in which case multiple narrowband interferers may be canceled. The number of notches in the frequency response of the FFE, will provide an estimate of the number of narrowband interferers.

Again, if there are multiple post-cursor FFE taps, a relatively wideband interferer may be canceled. The width of the notch in the frequency response of the FFE will provide an estimate of the bandwidth of the interferer.

The DFE taps can be similarly processed to detect and characterize the interference.

Figure 11:
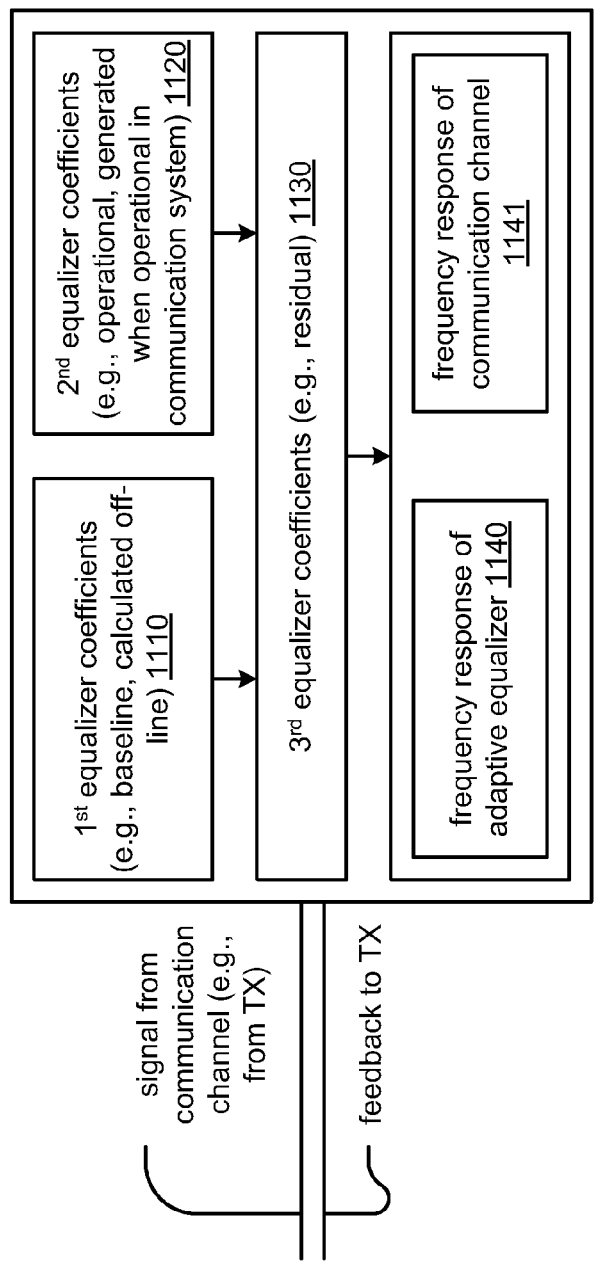
FIG. 11 illustrates an embodiment of communication device.

FIG. 11 illustrates an embodiment 1100 of communication device. The communication device is operative to communicate with other communication devices via at least one communication channel. The communication device may be of any of a variety of types of communication devices operative within any of a variety of types of communication systems including any such type described herein.

The communication device includes an equalizer therein (e.g., an adaptive equalizer for which coefficients are employed for performing equalization). Within the communication device, $1^{st}$ coefficients (1110) are included. These $1^{st}$ equalizer coefficients may be viewed as being a baseline group of equalizer coefficients and may be calculated off-line before the communication device is ever emplaced or installed (before ever operational) within a communication system. In some embodiments, the $1^{st}$ coefficients correspond to a certain model/type of communication device, and each and every actual communication device of that model/type need not undergo specific testing or analysis to determine a particular set of coefficients unique to that communication device, but uses a set of $1^{st}$ coefficients corresponding to that model/type (i.e., all communication devices of that model/type come with those $1^{st}$ coefficients loaded or stored therein). For example, the $1^{st}$ coefficients may be viewed as corresponding to coefficients associated with the equalizer of the communication device when operating in accordance with an ideal transmitter communication device and ideal communication channel (e.g., such as may be generated in accordance with production testing before the communication device is ever emplaced in an actual communication system application, such as within a diagnostic or testing facility in accordance with production of the communication device).

Once the communication device is operational within an application (e.g., a type of communication system), $2^{nd}$ coefficients (1120) are calculated based on the operational conditions of that particular application (e.g., in accordance with the communication device receiving a signal within the communication system). Once both of these $1^{st}$ and $2^{nd}$ sets of coefficients are available, then $3^{rd}$ coefficients (e.g., residual) (1130) may be generated by backing out $1^{st}$ coefficient effects from the $2^{nd}$ coefficients. These $3^{rd}$ coefficients maybe viewed as being coefficients generated from the $2^{nd}$ coefficients by backing out the $1^{st}$ coefficient effects there from. From these $3^{rd}$ coefficients (e.g., residual), the residual frequency response of the equalizer may be calculated. Also, the frequency response of the communication channel from which a signal has been received can be calculated (e.g., by inverting the frequency response of the equalizer or in accordance with the approaches described within the various applications incorporated by reference above and entitled "System and method for linear distortion estimation by way of equalizer coefficients").

It is also noted that once the frequency responses of the equalizer of this communication device and/or the communication channel are determined, they may be transmitted to at least one other communication device within the communication system (e.g., to the originally transmitting communication device that transmitted a signal to this communication device). In certain embodiments, only residual information associated with the frequency response of the equalizer (1140) and/or communication channel (1141) are transmitted to the originally transmitting communication device as opposed to the entire frequency response information (e.g., all of the equalizer coefficients). It is noted that either one or both of frequency domain and time domain information may be communicated, and some embodiments may prefer to transmit time domain information (e.g., equalizer coefficients) as opposed to frequency domain information (e.g., filter tap information). Such information may then be employed by the originally transmitting communication device for performing appropriate processing at the transmitter end of a communication link to compensate for and deal with the effects of the communication channel.

In accordance with the descriptions herein, it is noted that the residual information pertains to the portion of the equalizer coefficients employed by the communication device as corresponding to the communication channel excitation (e.g., excluding the communication device filtering effects and corresponding particularly to the communication channel).

Figure 12:
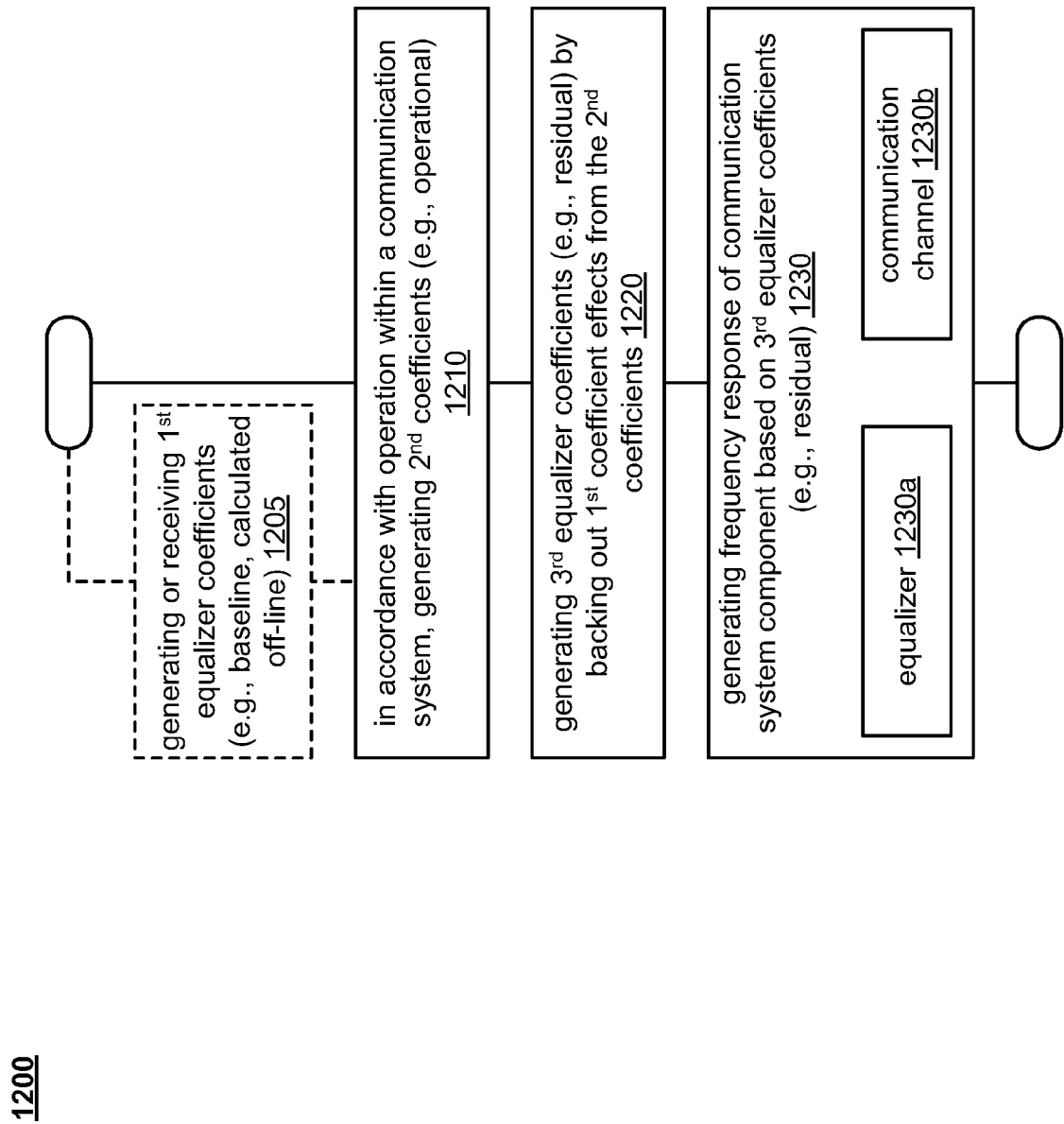
FIG. 12 illustrates an embodiment of a method for operating a communication device.

FIG. 12 illustrates an embodiment of a method for operating a communication device.

Referring to method 1200 of FIG. 12, the method 1200 begins by generating $2^{nd}$ coefficients for an equalizer (e.g., when $1^{st}$ coefficients have already been calculated or are already available, such as stored within a memory of the communication device), as shown in a block 1210. These $2^{nd}$ coefficients are generated in accordance with the communication device being in operation within a communication system (e.g., operational).

In some embodiments, the method 1200 operates by generating or receiving the $1^{st}$ equalizer coefficients, as shown in a block 1205. These $1^{st}$ equalizer coefficients may be viewed as being a baseline group of equalizer coefficients and may be calculated off-line before the communication device is ever emplaced or installed (before ever operational) within a communication system. In some embodiments, the $1^{st}$ coefficients correspond to a certain model/type of communication device, and each and every actual communication device of that model/type need not undergo specific testing or analysis to determine a particular set of coefficients unique to that communication device, but uses a set of $1^{st}$ coefficients corresponding to that model/type (i.e., all communication devices of that model/type come with those $1^{st}$ coefficients loaded or stored therein). For example, the $1^{st}$ coefficients may be viewed as corresponding to coefficients associated with the equalizer of the communication device when operating in accordance with an ideal transmitter communication device and ideal communication channel (e.g., such as may be generated in accordance with production testing before the communication device is ever emplaced in an actual communication system application, such as within a diagnostic or testing facility in accordance with production of the communication device).

The method 1200 continues by generating $3^{rd}$ equalizer coefficients (e.g., residual) by backing out $1^{st}$ coefficient effects from the $2^{nd}$ coefficients, as shown in a block 1220. These $3^{rd}$ coefficients maybe viewed as being coefficients generated from the $2^{nd}$ coefficients by backing out the $1^{st}$ coefficient effects there from.

The method 1200 then operates by generating frequency response of communication system component based on $3^{rd}$ equalizer coefficients (e.g., residual), as shown in a block 1230. This communication system component may be an equalizer within a communication device, as shown in a block 1230a, or the communication channel by which the communication device is operative to communicate with other communication devices, as shown in a block 1230b.

Figure 13:
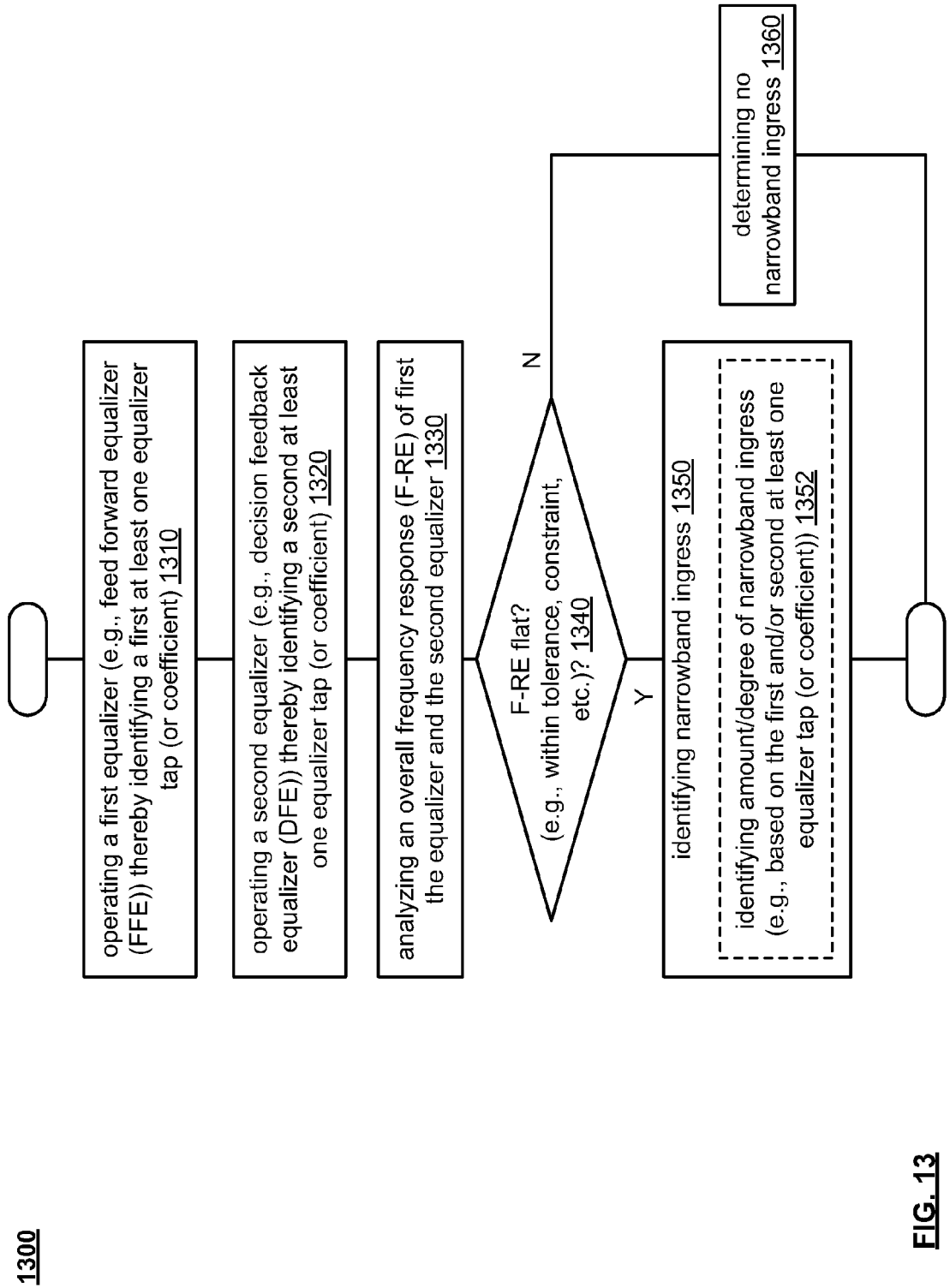
FIG. 13 illustrates an alternative embodiment of a method for operating a communication device.

FIG. 13 illustrates an alternative embodiment of a method 1300 for operating a communication device.

Referring to the method 1300 of FIG. 13, the method 1300 begins by operating a first equalizer (e.g., FFE) thereby identifying a first at least one equalizer tap (or coefficient), as shown in a block 1310. The method 1300 continues by operating a second equalizer (e.g., DFE) thereby identifying a second at least one equalizer tap (or coefficient), as shown in a block 1320.

The method 1300 then operates by analyzing the overall frequency response of the first equalizer and the second equalizer, as shown in a block 1330. That is to say, each respective equalizer (e.g., the first equalizer and the second equalizer) may have a respective frequency response, and the overall combined frequency response of the two respective equalizers undergoes analysis within operations of associated with a block 1330.

Within a block 1340, the method 1300 operates to determine whether or not the frequency response is flat (e.g., within a desired tolerance, constraint, etc.). If it is determined that the frequency response is not flat, then the method 1300 operates by determining no narrowband ingress within the signal, as shown in a block 1360. However, if it is determined that the frequency response is flat (again, within such a desired tolerance, constraint, etc.), then the method 1300 operates by identifying narrowband ingress within the signal undergoing processing by an equalizer including both the first equalizer and the second equalizer, as shown in a block 1350.

In addition, in certain embodiments, based upon analysis of the first at least one equalizer tap (or coefficient) and/or the second at least one equalizer tap (or coefficient), the method 1300 may also operate by identifying an amount or degree of narrowband ingress. That is to say, not only may the existence of such narrowband ingress be determined, but the relative amount or degree of such narrowband ingress may further be determined.

FIG. 14 illustrates yet another alternative embodiment of a method 1400 for operating a communication device.

Referring to method 1400 of FIG. 14, the method 1400 begins by operating a first equalizer (e.g., feed forward equalizer (FFE)) in accordance with introducing at least one notch or incursion thereby generating inter-symbol interference (ISI) or inter-code interference (ICI) (e.g., adjusting a first at least one equalizer tap (or coefficient)), as shown in a block 1410.

The method 1400 continues by operating a second equalizer (e.g., decision feedback equalizer (DFE)) in accordance with inverting for or compensating for the at least one notch in accordance with making overall frequency response (F-RE) of first equalizer and second equalizer being flat (e.g., within tolerance, constraint, etc.) (e.g., adjusting a second at least one equalizer tap (or coefficient)), as shown in a block 1420.

The method 1400 then operates by based on at least one value of the first at least one equalizer tap (or coefficient) of the first equalizer and/or at least one value of the second at least one equalizer tap (or coefficient) of the second equalizer, identifying narrowband ingress, as shown in a block 1430. In certain embodiments, the method 1400 continues by identifying amount/degree of narrowband ingress, as shown in a block 1432.

In some embodiments, such a baseband processing module and/or a processing module (which may be implemented in the same device or separate devices) can perform such processing to generate signals for transmission using at least one of any number of front ends, radios, and/or antennae to another communication device (e.g., which also may include at least one of any number of front ends, radios, and/or antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus comprising:
   a memory configured to store a first plurality of equalizer coefficients corresponding to filtering characteristics of the apparatus;
   an input configured to receive a signal from a communication channel;
   an equalizer, including a feed forward equalizer (FFE) and a decision feedback equalizer (DFE), configured to process the signal and to generate a second plurality of equalizer coefficients, including at least one equalizer coefficient corresponding to the FFE and at least one equalizer coefficient corresponding to the DFE, based on the signal; and
   a processing circuit configured to:
      process the first plurality of equalizer coefficients and the second plurality of equalizer coefficients to generate a third plurality of equalizer coefficients corresponding to a residual frequency response of the equalizer; and
      process the residual frequency response of the equalizer to generate a frequency response of the communication channel.

2. The apparatus of claim 1, wherein the FFE includes a first at least one adjustable or configurable tap, and the DFE includes a second at least one adjustable or configurable tap.

3. The apparatus of claim 1, wherein the residual frequency response of the equalizer excluding the filtering characteristics of the apparatus.

4. The apparatus of claim 1 further comprising:
   the processing circuit configured to process the first plurality of equalizer coefficients and the second plurality of equalizer coefficients to generate the third plurality of equalizer coefficients corresponding to a frequency response of the communication channel.

5. The apparatus of claim 1 further comprising:
   a communication device that is operative within at least one of a satellite communication system, a wireless communication system, a wired communication system, a fiber-optic communication system, and a mobile communication system.

6. An apparatus comprising:
   a memory configured to store a first plurality of equalizer coefficients corresponding to filtering characteristics of the apparatus;
   an input configured to receive a signal from a communication channel;
   an equalizer configured to process the signal and to generate a second plurality of equalizer coefficients based on the signal; and
   a processing circuit configured to process the first plurality of equalizer coefficients and the second plurality of equalizer coefficients to generate a third plurality of equalizer coefficients corresponding to a residual frequency response of the equalizer, wherein the residual frequency response of the equalizer excludes the filtering characteristics of the apparatus.

7. The apparatus of claim 6 further comprising:
   the processing circuit configured to process the residual frequency response of the equalizer to generate a frequency response of the communication channel.

8. The apparatus of claim 6, wherein the equalizer includes at least one of an feed forward equalizer (FFE) that includes a first at least one adjustable or configurable tap and a decision feedback equalizer (DFE) that includes a second at least one adjustable or configurable tap.

9. The apparatus of claim 6, wherein the equalizer includes a feed forward equalizer (FFE).

10. The apparatus of claim 6, wherein the equalizer includes a decision feedback equalizer (DFE).

11. The apparatus of claim 6, wherein the equalizer includes a feed forward equalizer (FFE) and a decision feedback equalizer (DFE).

12. The apparatus of claim 6, wherein:
    the processing circuit configured to process the first plurality of equalizer coefficients and the second plurality of equalizer coefficients to generate the third plurality of equalizer coefficients corresponding to a frequency response of the communication channel.

13. The apparatus of 6 further comprising:
    a communication device that is operative within at least one of a satellite communication system, a wireless communication system, a wired communication system, a fiber-optic communication system, and a mobile communication system.

14. A method execution by a communication device, the method comprising:
    within a memory, storing a first plurality of equalizer coefficients corresponding to filtering characteristics of the apparatus;
    via an input, receiving a signal from a communication channel;
    operating an equalizer to process the signal and to generate a second plurality of equalizer coefficients based on the signal;
    processing the first plurality of equalizer coefficients and the second plurality of equalizer coefficients to generate a third plurality of equalizer coefficients corresponding to a residual frequency response of the equalizer; and
    processing the residual frequency response of the equalizer to generate a frequency response of the communication channel.

15. The method of claim 14 further comprising:
    processing the residual frequency response of the equalizer to generate a frequency response of the communication channel 16. The method of claim 14, wherein the residual frequency response of the equalizer excluding the filtering characteristics of the apparatus.

17. The method of claim 14, wherein the equalizer includes a feed forward equalizer (FFE) or decision feedback equalizer (DFE).

18. The method of claim 14, wherein the equalizer includes a feed forward equalizer (FFE) and a decision feedback equalizer (DFE).

19. The method of claim 14 further comprising:
adjusting at least one of a first at least one adjustable or configurable tap within a feed forward equalizer (FFE) of the equalizer and a second at least one adjustable or configurable tap of a decision feedback equalizer (DFE) of the equalizer.

20. The method of claim 14, wherein the communication device is operative within at least one of a satellite communication system, a wireless communication system, a wired communication system, a fiber-optic communication system, and a mobile communication system.

* * * * *

UNITED STATES PATENT AND TRADEMARK OFFICE
CERTIFICATE OF CORRECTION

| | | Page 1 of 1 |
|---|---|---|
| PATENT NO. | : 8,817,865 B2 | |
| APPLICATION NO. | : 13/406777 | |
| DATED | : August 26, 2014 | |
| INVENTOR(S) | : Currivan et al. | |

It is certified that error appears in the above-identified patent and that said Letters Patent is hereby corrected as shown below:

In the claims

Col. 24, line 35, in claim 13: Replace "The apparatus of 6" with --The apparatus of claim 6--

Col. 24, line 41, in claim 14: Replace "A method execution by a communication device" with --A method for execution by a communication device--

Signed and Sealed this
Sixteenth Day of February, 2016

Michelle K. Lee
*Director of the United States Patent and Trademark Office*